United States Patent [19]

Stanley et al.

[11] Patent Number: 4,555,665
[45] Date of Patent: Nov. 26, 1985

[54] MAGNETIC FLUX METHOD FOR MEASURING TUBULAR WALL THICKNESS

[75] Inventors: Roderic K. Stanley; Marvin Milewits; Robert C. Knauer, Jr.; James E. Bradfield, all of Houston, Tex.

[73] Assignee: PA Incorporated, Houston, Tex.

[21] Appl. No.: 405,203

[22] Filed: Aug. 4, 1982

[51] Int. Cl.⁴ .................. G01B 7/10; G01R 33/12
[52] U.S. Cl. .................... 324/229; 324/239
[58] Field of Search ............... 324/229–231, 324/228, 239, 243, 262; 336/205

[56] References Cited

U.S. PATENT DOCUMENTS 2,982,888  5/1961  Whearley .................. 336/205
4,292,588  9/1981  Smith ...................... 324/221

FOREIGN PATENT DOCUMENTS 913780 12/1962 United Kingdom ............... 324/239

*Primary Examiner*—Gerard R. Strecker
*Assistant Examiner*—Walter E. Snow
*Attorney, Agent, or Firm*—Norvell & Associates

[57] ABSTRACT

A method and apparatus are provided for effecting the inspection of a ferromagnetic element, or piping, and particularly piping that is already installed. The invention incorporates a device for indicating wall thickness of a length of the ferromagnetic element, including means for producing a value of magnetic flux extending longitudinally through a portion of the element. A voltage generating device is disposed in surrounding relationship to the element and is movable axially relative to the length of the element containing the value of the magnetic flux. Means for indicating the voltage generated in the voltage generating means by the value of the magnetic flux also are provided. A saturation level of magnetic flux is induced by a multi-turn supplied with electrical current sufficient to produce saturation. The voltage induced in a central pickup coil is amplified, integrated and correlated to average thickness of the pipe. The differential of the voltages generated by the two end pickup coils is amplified, integrated and correlated to discontinuities from the average thickness.

12 Claims, 6 Drawing Figures

MAGNETIC FLUX METHOD FOR MEASURING TUBULAR WALL THICKNESS

BACKGROUND OF THE INVENTION

1. Field of the invention

The invention relates to a method and apparatus for effecting the testing of installed ferromagnetic piping by utilization of an induced magnetic flux.

2. Description of the prior art

Modern refineries, petrochemical plants and well pumping installations represent a veritable maze of installed piping and other tubular elements required to carry fluids through the various steps of the processes involved in such industries. Much of this piping is of ferromagnetic material. In many instances, the fluids carried by the pipes are either highly toxic, flammable or are under high pressure and temperatures so that a breakage of any installed pipe due to internal deterioration of the pipe by corrosion or erosion presents a serious environmental and safety hazard. The oil refining and petrochemical industries have long sought apparatus for effecting the reliable testing of installed ferromagnetic piping to determine in advance when any section of an installed pipe has been internally or externally corroded or eroded to the point where rupture may be anticipated.

A variety of testing techniques have been employed involving magnetic flux leakage methods, ultrasonics and even radiation. Such existing apparatuses, however, are generally expensive to construct and time consuming to operate, so that the inspection expense is a matter of significant economic impact to the particular plant. Moreover, prior art devices have generally required that they be operated by highly skilled and trained technicians, thus further contributing to the high cost of such inspection. Lastly, many of the existing testing devices are effective over only a limited area of the pipe, requiring that the devices be painstakingly scanned over the entire periphery of the pipe requiring movement relative to the pipe in both an axial and a radial direction. In many installations, the pipes are closely adjacent to other pipes or other mechanisms so that the scanning around the periphery of an installed pipe is a virtual impossibility.

SUMMARY OF THE INVENTION

The invention provides a method and apparatus for effecting the inspection of installed ferromagnetic piping or other tubular members by utilization of an induced saturation value of magnetic flux. An axially split sleeve or spool is employed which may be readily clamped in surrounding relationship to an installed pipe. A saturation level of magnetic flux is induced in the pipe by a flexible cable which is wrapped around the spool in a multi-turn or single turn configuration. The cable includes a large number of insulated electrical conductors which are connected at their opposite ends to a pair of connection blocks. After wrapping the spool with the cable, the connection blocks are brought into juxtaposition or, in the case of a pin and slot connection, they are intermeshed, and the resulting electrical connections provide a multi-turn current path flow around the periphery of the pipe. A D.C. current is applied to this multiturn path of sufficient magnitude to effect magnetic flux saturation of the portion of the pipe on which the spool is installed. Obviously, as the spool is moved axially along the pipe, the saturated magnetic flux proceeds with the spool axially along the pipe.

One or more pickup coils are then mounted in surrounding relationship to the spool. In the preferred embodiment of the invention, the pickup coils are imbedded in peripheral channels provided on the exterior or interior of the spool and each pickup coil comprises a plurality of conductors which have their opposite ends mounted in two connecting boxes which are brought into juxtaposition and electrically connected by the closing of the spool around the pipe to be tested. In any event, a separate multi-turn current path is provided through each of the pickup coils. When a single pickup coil is utilized, the output signal is preferably integrated and then indicated. Such integrated signal provides a reading of the average thickness of the pipe around the annular section encompassed by the pickup coil at any time. In the preferred embodiment of the invention, three axially adjacent pickup coils are utilized with the center coil being connected to an amplifying, integrating and indicating circuit for again providing an indication of average wall thickness of the adjacent peripheral portion of the pipe. The two end pickup coils are connected in differential relationship, permitting much higher amplification, and the resulting amplified differential voltage signal is integrated and then indicated concurrently with the average signal from the center coil so that the departures of the wall thickness from a normal average will be accentuated and will be shown in relationship to the average thickness.

The axial position of the entire apparatus, including the saturating coil and the pickup coils is preferably indicated by the association of the spool in relation to the pipe and generating a signal in response to the axial movement of the pickup coil along the pipe which indicates the position of the spool, hence of the pickup coils. This signal is preferably employed on a recording chart type meter as the X-axis input and the amplified and integrated signals derived from the center coil and the two differentially connected end coils are separately applied to the recording chart on the Y-axis. Thus, the precise location along the pipe of any significant wall thickness variation is indicated on the recording chart.

DESCRIPTION OF THE PREFERRED EMBODIMENTS

Figure 1:
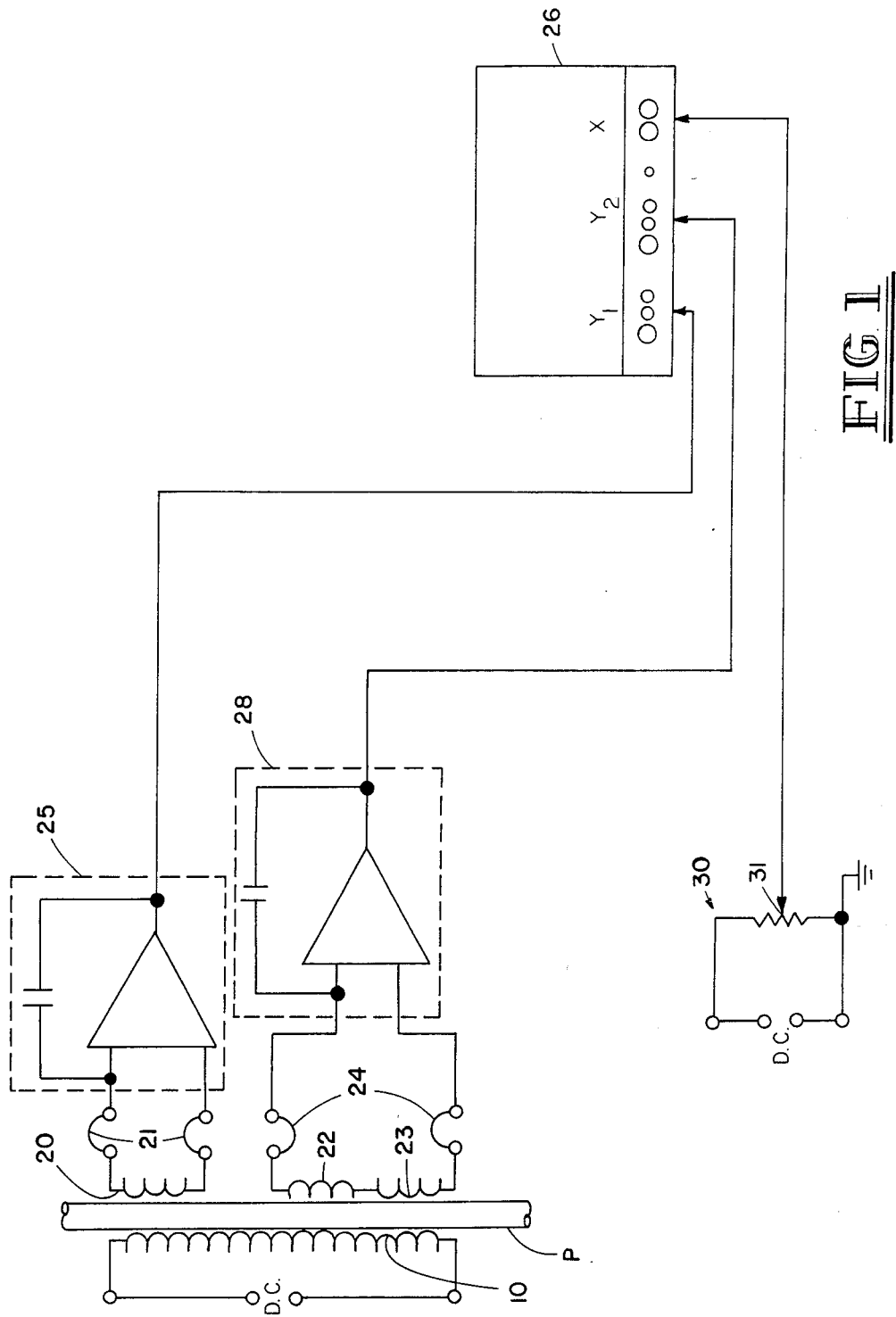
FIG. 1 is a schematic circuit diagram of a pipe inspection apparatus embodying this invention.
Figure 2:
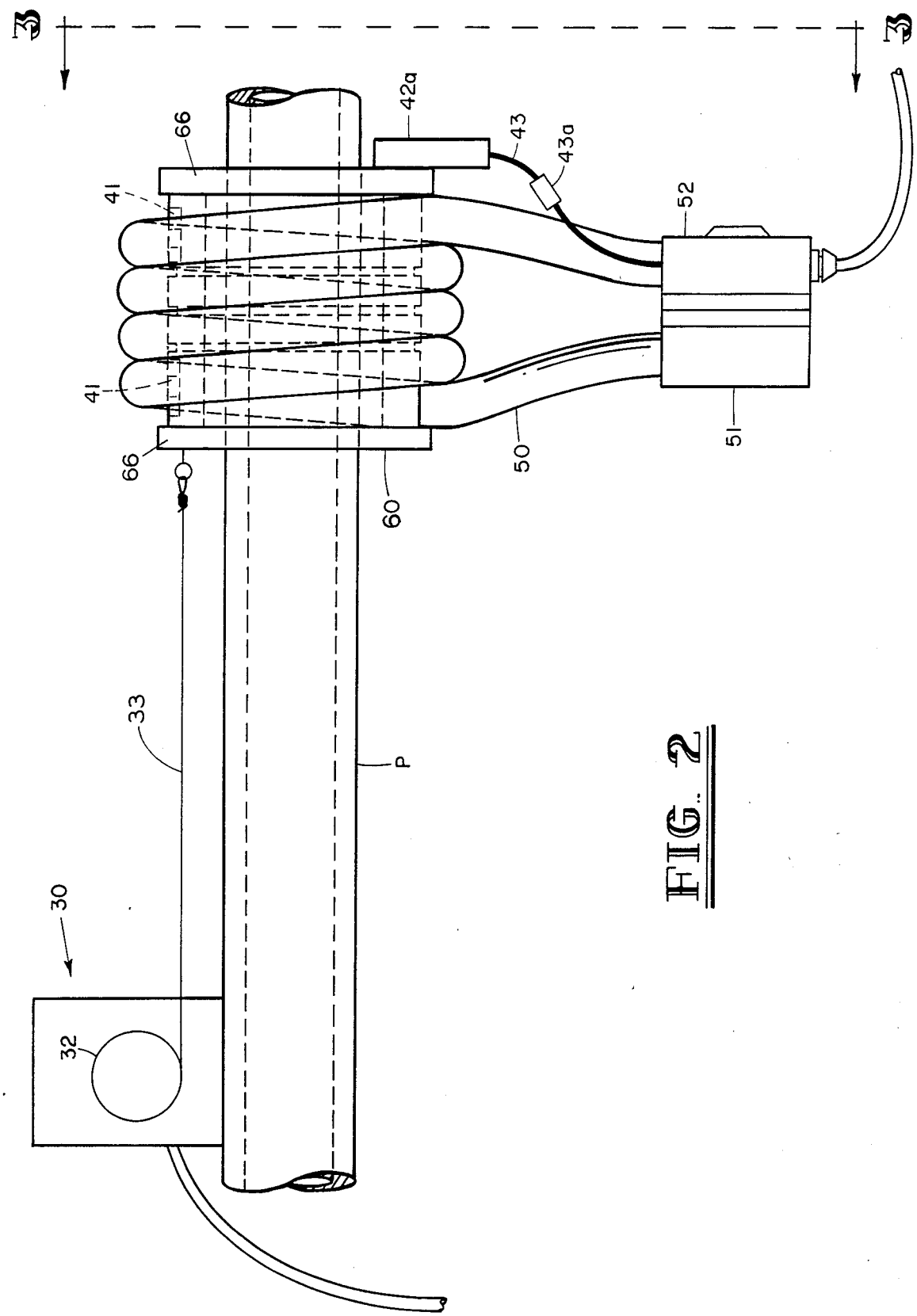
FIG. 2 is a schematic elevational view of the principal components of the pipe inspection apparatus embodying this invention.
Figure 3:
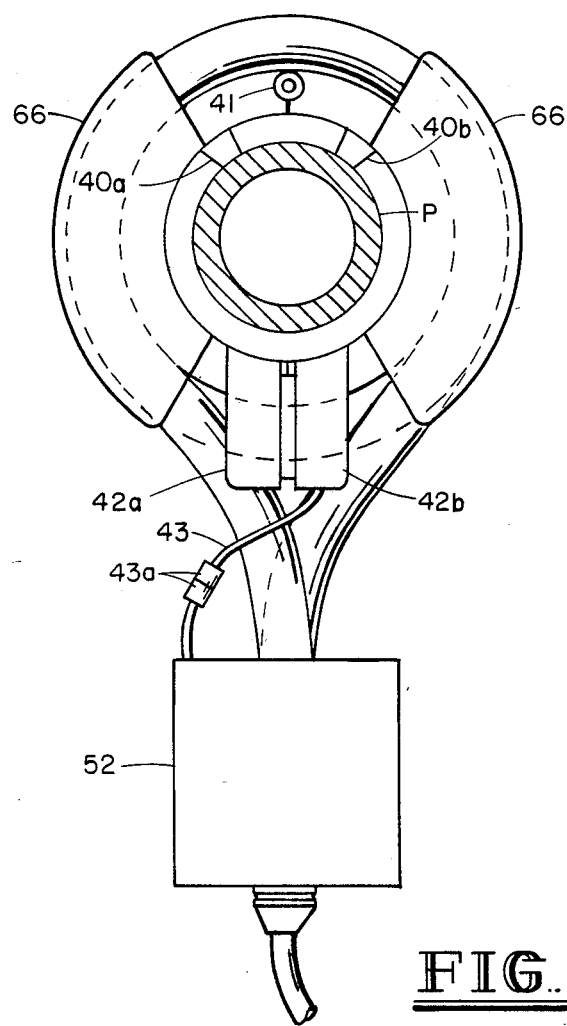
FIG. 3 is a sectional view taken on the plane 3—3 of FIG. 2.

The principles of this invention may be best understood by first referring to the schematic circuit diagram of FIG. 1 and schematic apparatus diagrams of FIGS. 2 and 3. A length of ferromagnetic pipe P to be inspected is surrounded by a saturating coil 10 which is supplied with sufficient D.C. current to achieve magnetic saturation of at least that portion of the pipe encompassed by the coil 10. A first pickup coil 20 is provided in surrounding relationship to the pipe P within which, as the saturating coil 10 and pickup coil 20 are concurrently moved axially along the length of the pipe, is induced a voltage proportional to the average wall thickness of each peripheral band portion of the pipe momentarily surrounded by the moving pickup coil 20. The output of coil 20 is connected by a cable 21 to the input terminals of a conventional amplifying and integrating circuit 25 and the integrated voltage output of the circuit 25 is supplied to the Y-axis input Y1 of a conventional chart type recording device 26. The integration step eliminates any variance due to speed or direction of movement of coils 10 and 20 relative to pipe P.

A transducer 30 is provided, which may comprise a simple resistance potentiometer across which is applied a suitable D.C. voltage. The movable contact 31 of transducer 30 is shifted in direct proportion to the axial movement of the saturating coil 10 and pickup coil 20 along the length of pipe P so that the voltage output of transducer 30 provides a voltage signal indicating the actual axial position of the pickup coil relative to the pipe. This voltage signal is applied to the X-axis input terminals X of the recorder 26. The resulting trace on recorder 26 will be a plot of average wall thickness versus axial position of the pipe. It should be noted that the wall thickness signal is always produced by the total magnetic flux existing in a particular peripheral band of the pipe P, and not by leakage flux, which represents the prior art approach. The utilization of a saturated value of flux in the pipe P produces a total flux proportional to the cross-sectional area of the pipe P in theory, and in practice is proportional to the average wall thickness of the band of pipe encompassed by pickup coil 20, within acceptable limits.

In order to improve the sensitivity of the wall thickness measurements, two additional pickup coils 22 and 23 are mounted in surrounding relationship to the pipe P and preferably are positioned on opposite sides of the first mentioned pickup coil 20, although this physical arrangement is not shown in the schematic circuit diagram in order to simplify the diagram. The additional pickup coils 22 and 23 are connected in turn-reversed relationship and the differential voltage output of such additional pickup coils is transmitted by a cable 24 to the input of a second conventional amplifier and integrating circuit 28 and then applied to a second Yaxis input terminal Y2 provided on the recorder 26. Through the employment of a differential voltage pickup, a much higher degree of amplification can be applied without running the recorder 26 off-scale and this differential voltage signal will more clearly indicate differences in the average wall thicknesses of the peripheral bands of pipe P defined by the pickup coils 22 and 23. In fact, the sensitivity of the differential pickup coils 22 and 23 is such as to indicate changes in surface texture of the pipe interior and exterior, which provides information as to the state of internal and external corrosion. Recording this differential signal concurrently with the signal from coil 20 representing the average wall thickness of the pipe P gives a more clear indication of the existence of increased thickness portions of the pipe and the extent of reduction in thickness compared to the average wall thickness.

The apparatus embodying the aforedescribed circuitry is calibrated by first positioning the saturating coil 10 and the pickup coil 20 at a region of the pipe where the average wall thickness is known, removing the effects of magnetic history of the calibrating region by passing a saturating value of D. C. current through coil 10 in each of two directions, and measuring the net magnetic flux in the pipe or tubing. This reading may be utilized as the reference for the known wall thickness to calibrate the apparatus.

Figure 5:
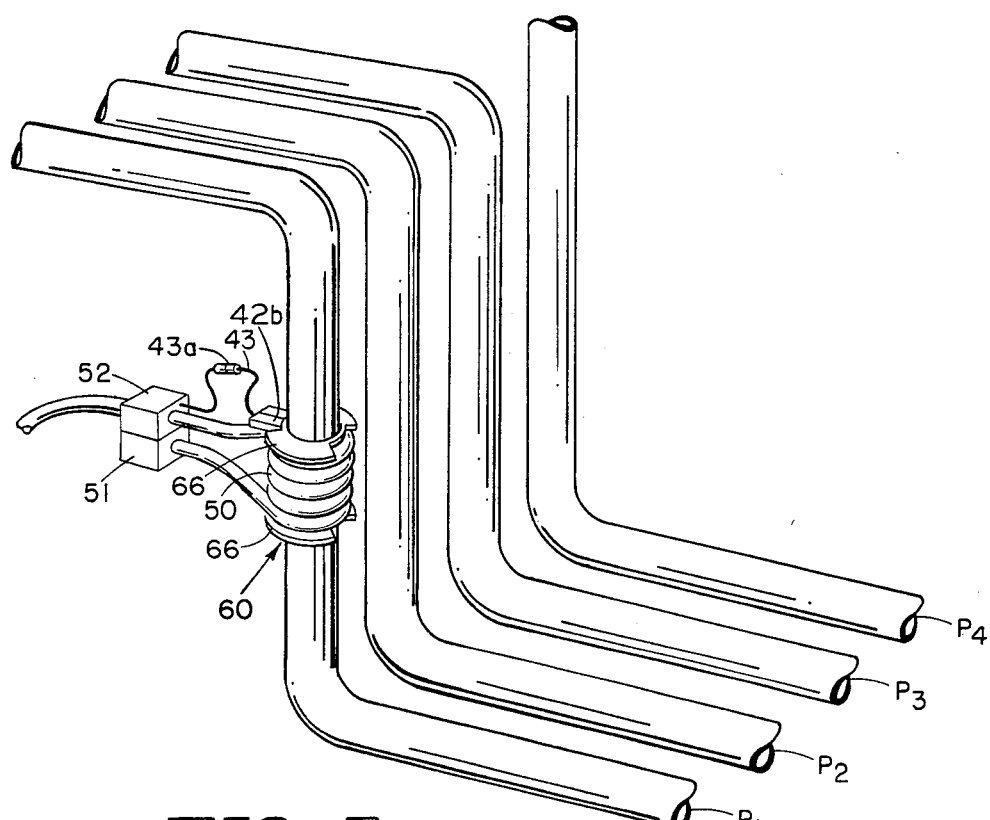
FIG. 5 is a perspective view illustrating the installation of the coil mounting device of FIG. 4 on one of a bank of installed pipes.

A major problem arises in the inspection of installed pipe because a free end of the pipe is not available without disconnecting the pipe from the installation. Further, many installed pipes lie closely adjacent to each other, as indicated in FIG. 5. To overcome this problem, the apparatus schematically represented in FIGS. 2 and 3 has been developed. An axially split cylindrical spool 60 is provided having hinge elements 41 for permitting the spool to be opened sufficiently to be placed in surrounding relationship to an installed length of pipe. Spool 60 has imbedded in its periphery the three pickup coils 20, 22 and 23, which are not shown in FIGS. 2 and 3, but each such coil involves a plurality of closely spaced individual insulated conductors, the ends of which are respectively connected to multicontact connection blocks 42a and 42b which are brought into mating engagement when the spool 60 is assembled around the pipe P.

In its circumferentially closed position, the spool 60 is preferably provided with at least two internal projections 40a and 40b which engage the periphery of pipe P and maintain the spool 60 in reasonably concentric relationship to the pipe P. Concentricity does not, however, affect the accuracy of the measurements of wall thickness, within acceptable limits.

The electrical connections contained within the connection blocks 42a and 42b correspond to those shown in the circuit diagram in FIG. 1 and effect the connection of the conductor elements of each of the coils 20, 22 and 23 into three distinct multi-turn current paths. Additionally, the output cables 21 and 24 are combined in a single cable 43 which leads to the remotely located integrating and amplifying circuits 25 and 28. A quick disconnect coupling 43a is provided in cable 43 to facilitate the assembly of the spool 60 around the installed length of pipe P.

Figure 6:
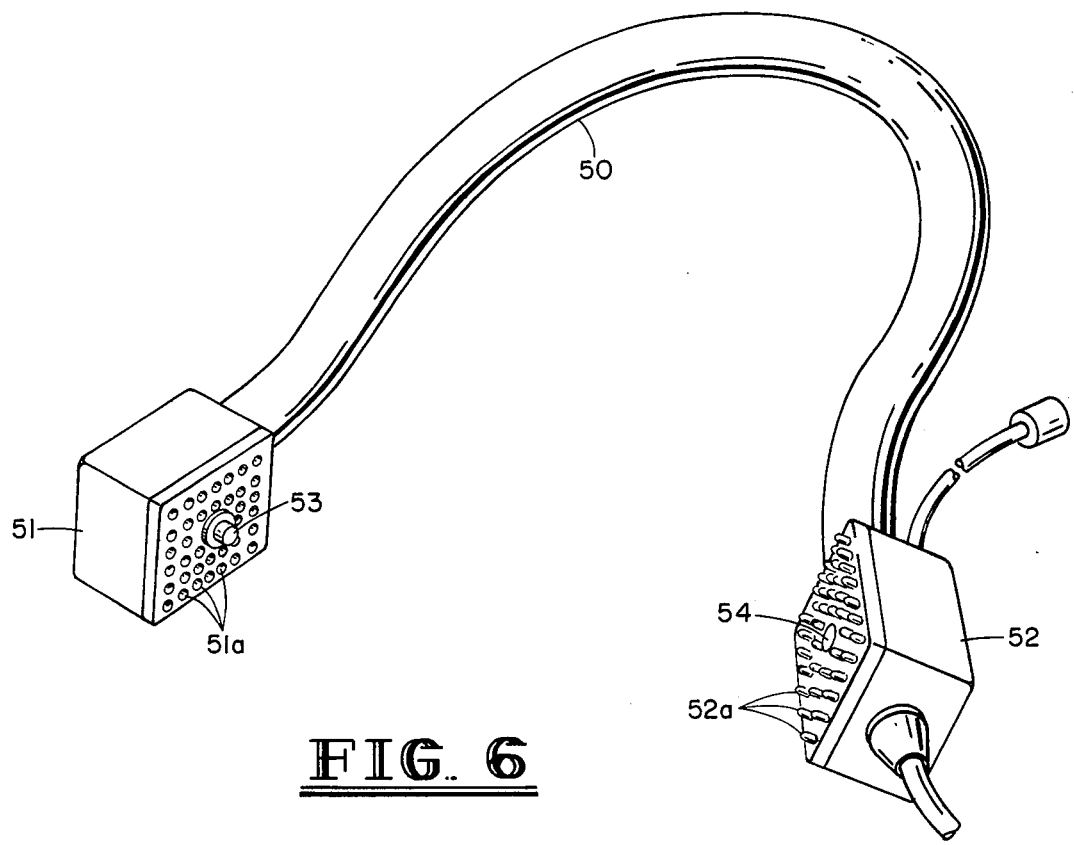
FIG. 6 is a perspective view of the unwound saturating coil element employed in the apparatus embodying this invention.

The saturating coil 10 is preferably applied to the installed length of pipe P by wrapping a flexible conductor 50 around the periphery of the spool 60 after the spool has been applied around the pipe P to form an encircling coil. Radial flanges 66 of the spool 60 retain the conductor 50. Cable 50 includes a plurality of individual insulated conductors (not shown) which terminate at each end in connection blocks 51 and 52 which are respectively of the hole and pin variety, as best shown in FIG. 6. To facilitate the connection of the multiprong connection blocks 51 and 52, and to retain such blocks in assembly, a conventional retaining plunger 53 is provided on one of the connection blocks and enters into an aperture 54 provided on the other block. Suitable resilient latch means (not shown) operate on the inserted plunger to maintain the connecting blocks 51 and 52 in assemblage.

When such connector blocks are brought into juxtaposition, so that the pins 52a of the one block enter the holes 51a of the other, the resulting connections provide a multi-turn single current path around the periphery of the installed length of pipe P. For example, at least two hundred conductors are incorporated in the cable 50 and at least four turns of the cable 50 are made around the spool 60 so that a total of eight hundred turns are available to apply the saturating D.C. current. This substantially reduces the amount of D.C. current required to effect saturation of the portion of pipe P surrounded by the pickup coils 20, 22 and 23.

The transducer 30 is schematically represented by a drum or pulley 32 around which is wound a cable 33 having its free end attached to the spool 60. Thus, as the spool 60 is moved axially along the length of pipe P, the pulley 32 is rotated to effect operation of the transducer 30 and generate a voltage signal proportional to the axial position of the block 40 and the pickup coils mounted thereon relative to the pipe P.

Figure 4:
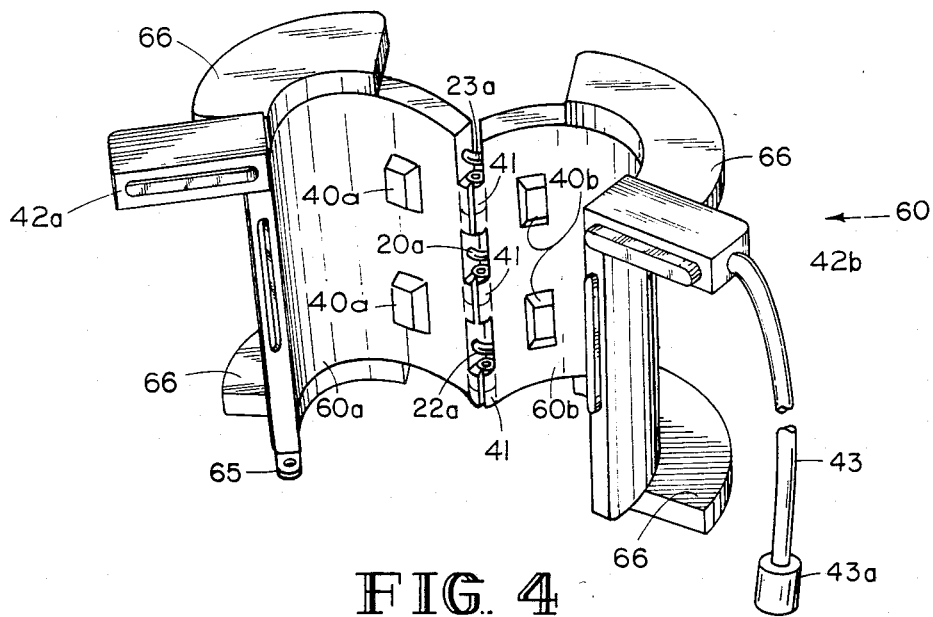
FIG. 4 is a perspective view of an actual coil mounting element employed in the schematic apparatus shown in FIG. 2 such coil mounting element being shown in its open or expanded position.

Referring now to FIG. 4, there is shown a thermoplastic split spool 60, a material exhibiting substantially nonmagnetic properties, actually employed in the practice of this invention. Spool 60 comprises two substantially identical, semi-cylindrical half portions 60a and 60b which are pivotally interconnected by hinges 41. Internally projecting positioning lugs 40a and 40b are provided on the inner surface of the spool halves to position the spool in roughly concentric relationship with respect to the periphery of the pipe to be inspected. The conductors forming the pickup coils 20, 22 and 23 are not shown in detail but the cables containing such conductors are indicated in the hinge joints at 20a, 22a and 23a. The connection blocks 42a and 42b are suitably mounted at one axial end of the split spool 60 and are brought into juxtaposition by the closing of the spool 60 around the pipe. A spring latch 65 may be provided on the other axial end of spool 60 to maintain the two halves in their closed position. When the connection blocks 42a and 42b are brought into juxtaposition, circuit connections are effected to provide the three multi-turn current paths represented by the coils 20, 22 and 23 in FIG. 1. The cables 21 and 24 representing the output connections of such coils are incorporated in a single output cable 43. End flanges 66 provide a channel for mounting the turns of flexible cable 50 securely around spool 60.

FIG. 5 represents dramatically the need for an axially split spool arrangement for applying the testing device embodying this invention to installed lengths of pipe. An array of pipes $P_1$, $P_2$, $P_3$, and $P_4$, are shown in a configuration that is very common in many refineries and petrochemical plants. With the axially split spool 60 embodying this invention, such spool may be applied to any portion of any one of the pipes, the flexible conductor 50 making up the saturating coil wrapped around this spool and the inspection of the enwrapped pipe accomplished by moving the spool along the length of pipe.

Although the invention has been described in terms of specified embodiments which are set forth in detail, it should be understood that this is by illustration only and that the invention is not necessarily limited thereto, since alternative embodiments and operating techniques will become apparent to those skilled in the art in view of the disclosure. Accordingly, modifications are contemplated which can be made without departing from the spirit of the described invention.

What is claimed and desired to be secured by Letters Patent is:

1. A method of inspecting a length of ferromagnetic pipe to determine the average wall thickness of the pipe as a function of the axial position along the pipe, comprising the steps of:
    disposing a multi-turn encircling saturating coil in surrounding relationship to the pipe;
    producing a value of magnetic flux entending longitudinally through a portion of the pipe by applying a current to the encircling coil;
    disposing a voltage generating means in surrounding relationship to the pipe;
    moving the saturating coil and the voltage generating means relative to the pipe at a varying speed;
    integrating the voltage generated in the voltage generating means; and
    correlating the integrated voltage to the average thickness of the pipe as a function of axial length.

2. A method of inspecting a length of ferromagnetic pipe to determine the averge wall thickness of the pipe as a function of the axial position along the pipe, comprising the steps of:
    disposing a multi-turn encircling saturating coil in surrounding relationship to a cylindrical member fabricated from a material exhibiting substantially non-magnetic properties;
    disposing the cylindrical member around the pipe;
    producing a value of magnetic flux extending longitudinally through a portion of the pipe;
    disposing a voltage generating means in surrounding relationship to the pipe;
    moving the saturating coil and the voltage generating means axially relative to the pipe;
    integrating the voltage generated in the voltage generating means; and
    correlating the integrated voltage to the average thickness of the pipe as a function of axial length, the saturating coil and the voltage generating means moving relative to the pipe at a varying speed.

3. The method of claim 2 wherein the cylindrical member is axially split.

4. The method of claim 3 wherein the axially split cylindrical member is hinged for disposing the cylindrical member around the pipe.

5. A method of inspecting a length of ferromagnetic pipe to determine the average wall thickness of the pipe as a function of the axial position along the pipe, comprising the steps of:
    disposing a cylindrical member having a multi-turn encircling saturating coil surrounding the cylindrical member and a pick-up coil embedded in the cylindrical member around the pipe;
    producing a saturating value of magnetic flux extending longitudinally through a portion of the pipe by applying a current to the encircling coil;
    moving the cylindrical member axially relative to the pipe;
    integrating the voltage generated in the pick-up coil; and
    correlating the integrated voltage to the average thickness of the pipe as a function of axial length, the integration of the voltage generated in the pick-up coil occuring as a cylindrical member moves relative to the pipe at a varying speed.

6. The method of claim 5 wherein the cylindrical member comprises a member fabricated from material exhibiting substantially nonmagnetic properties.

7. A method of inspecting a length of ferromagnetic pipe to determine the average wall thickness of the pipe and to determine variations in average wall thickness as a function of the axial position along the pipe, comprising the steps of:
   disposing a multi-turn encircling saturating coil in surrounding relationship to the pipe;
   producing a saturating value of magnetic flux extending longitudinally through a portion of the pipe by applying a current to the encircling coil;
   disposing a plurality of encircling pickup coils around the pipe, at least one pickup coil being in turn reversed relationship to another pickup coil;
   moving the encircling saturating coil and the pickup coils relative to the pipe at a varying speed;
   integrating the voltage generated in one pickup coil;
   correlating the integrated voltage in the one pickup coil to the average thickness of the pipe as a function of axial length;
   integrating the difference in voltage generated in the turn reversed pickup coils; and
   correlating the integrated differential voltage in the turn reversed pickup coils to the variations in average thickness of the pipe as a function of axial length.

8. The method of indicating variations in average wall thickness of an installed length of ferromagnetic pipe comprising the steps of:
   1. mounting an axially split pickup coil on an axially split spool, said coil having connectors at each of its ends which are interengagable when said split spool is in a circumferential configuration to define a multi-turn current path;
   2. closing the split spool around an installed length of ferromagnetic pipe, thereby positioning the pickup coil in surrounding relationship to the pipe;
   3. wrapping the installed spool with a flexible cable containing a plurality of individual insulated conductors connected at their opposite ends to connection blocks;
   4. interconnecting the connecting blocks to define a second multi-turn current path around the pipe;
   5. passing sufficient electrical current through the second multi-turn current path to produce a saturation value of magnetic flux extending longitudinally through the portion of the pipe surrounded by the spool;
   6. moving the spool axially along the pipe, thereby generating a voltage in the pickup coil by the saturated magnetic flux; and
   7. indicating the voltage generated in the pickup coil by the saturated magnetic flux.

9. The method of indicating variations in average wall thickness of an installed length of ferromagnetic pipe comprising the steps of:
   1. mounting three axially split pickup coils on an axially split spool, each said coil having connectors each of its ends which are interengagable when said split spool is in a circumferential configuration to define three multi-turn current paths;
   2. closing the axially split spool around an installed length of ferromagnetic pipe, thereby positioning the pickup coils in surrounding relationship to the pipe;
   3. wrapping the installed spool with a flexible cable containing a plurality of individual insulated conductors connected at their opposite ends to connection blocks;
   4. interconnecting the connecting blocks to define a fourth multi-turn current path around the pipe;
   5. passing sufficient electrical current through the fourth multi-turn current path to produce a saturation value of magnetic flux extending longitudinally through the portion of the pipe surrounded by the spool;
   6. moving the spool axially along the pipe, thereby generating voltages in each of the three pickup coils by the saturated magnetic flux;
   7. indicating the voltage generated in the center pickup coil by the saturated magnetic flux; and
   8. indicating the voltage differential generated in the two end pickup coils by the saturated magnetic flux.

10. The method of indicating variations in average wall thickness of an installed length of ferromagnetic pipe comprising the steps of:
    1. mounting three axially split pickup coils on an axially split spool, each said coil having connectors at each of its ends which are interengagable when said split spool is in a circumferential configuration to define three multi-turn current paths;
    2. closing the axially split spool around an installed length of ferromagnetic pipe, thereby positioning the pickup coils in surrounding relationship to the pipe;
    3. wrapping the installed spool with a flexible cable containing a plurality of individual insulated conductors connected at their opposite ends to connection blocks;
    4. interconnecting the connecting blocks to define a fourth multi-turn current path around the pipe;
    5. passing sufficient electrical current through the fourth multi-turn current path to produce a saturation value of magnetic flux extending longitudinally through the portion of the pipe surrounded by the spool;
    6. moving the spool axially along the pipe, thereby generating voltages in each of the three pickup coils by the saturated magnetic flux;
    7. integrating and indicating the voltage generated in the center pickup coil by the saturated magnetic flux; and
    8. integrating and indicating the voltage differential generated in the two end pickup coils by the saturated magnetic flux.

11. The method of indicating variations in average wall thickness of an installed length of ferromagnetic pipe comprising the steps of:
    1. mounting an axially split pickup coil on an axially split spool, said coil having connectors at each of its ends which are interengagable when said split spool is in a circumferential configuration to define a multi-turn current path;
    2. closing the axially split spool around an installed length of ferromagnetic pipe, thereby positioning the pickup coil in surrounding relationship to the pipe;
    3. wrapping the installed spool with a flexible cable containing a plurality of individual insulated conductors connected at their opposite ends to connection blocks;
    4. interconnecting the connecting blocks to define a second multi-turn current path around the pipe;
    5. passing sufficient electrical current through the second multi-turn current path to produce a saturation value of magnetic flux extending longitudinally through the portion of the pipe surrounded by the spool;
6. moving the spool axially along the pipe, thereby generating a voltage in the pickup coil by the saturated magnetic flux;
7. generating a voltage signal indicating the axial position of the pickup coil along the pipe; and
8. indicating the voltage generated in the pickup coil by the saturated magnetic flux as a function of the voltage signal indicating the axial position of the coil relative to the pipe.

12. The method of indicating variations in average wall thickness of an installed length of ferromagnetic pipe comprising the steps of:
1. mounting three axially split pickup coils on an axially split spool, each said coil having connectors at each of its ends which are interengagable when said split spool is in a circumferential configuration to define three multi-turn current paths;
2. closing the axially split spool around an installed length of ferromagnetic pipe, thereby positioning the pickup coils in surrounding relationship to the pipe;
3. wrapping the installed spool with a flexible cable containing a plurality of individual insulated conductors connected at their opposite ends to connection blocks;
4. interconnecting the connection blocks to define a fourth multi-turn current path around the pipe;
5. passing sufficient electrical current through the fourth multi-turn current path to produce a saturation value of magnetic flux extending longitudinally through the portion of the pipe surrounded by the spool;
6. moving the spool axially along the pipe, thereby generating voltages in each of the three pickup coils by the saturated magnetic flux;
7. generating a voltage signal as a function of the axial position of the pickup coils relative to the pipe;
8. integrating the voltage generated in the center pickup coil by the saturated magnetic flux;
9. integrating the voltage differential generated in the two end pickup coils by the saturated magnetic flux; and
10. separately recording the integrated voltage generated by the center pickup coil and the integrated voltage differential as a function of the voltage signal representing the axial position of the coils relative to the installed pipe.

* * * * *